United States Patent [19]
Siekmann et al.

[11] Patent Number: 4,617,130
[45] Date of Patent: Oct. 14, 1986

[54] PROCESS AND EQUIPMENT, IN PARTICULAR FOR THE CONDITIONING OF WASTE WATER SLUDGES

[75] Inventors: Helmut E. Siekmann, Hermannstrasse 3A, 1000 Berlin 37/Zehlendorf (West), Fed. Rep. of Germany; Jürgen Bässler, Dortmund; Winfried Liebig, Iserlohn, both of Fed. Rep. of Germany

[73] Assignees: Uhde GmbH, Dortmund; Helmut E. Siekmann, Berlin, both of Fed. Rep. of Germany

[21] Appl. No.: 761,079

[22] Filed: Jul. 31, 1985

[30] Foreign Application Priority Data

Aug. 2, 1984 [DE] Fed. Rep. of Germany ....... 3428535

[51] Int. Cl.$^4$ .................. B01D 17/06; B01D 35/06
[52] U.S. Cl. .................. 210/748; 204/149; 204/186; 210/542
[58] Field of Search .............. 210/748, 738, 541, 542; 204/149, 186

[56] References Cited

U.S. PATENT DOCUMENTS 4,477,357 10/1984 Sittenfield .................. 210/748

Primary Examiner—Frank Sever
Attorney, Agent, or Firm—Toren, McGeady, Stanger, Goldberg & Kiel

[57] ABSTRACT

It is intended to simplify and make easier cavitation treatment in a process and equipment for treatment of liquid/solids mixtures, in particular for conditioning of suspended solids by means of cavitation. In the process, this is achieved by means of the fact that the material mixture to be treated is withdrawn from a high-level reservoir, passed through at least one pipe bend and then to a drop-pipe in such a way that a cavitation zone forms in the flow at least in areas upstream, within and downstream of the pipe bend and in terms of equipment by means of the fact that the equipment consists of a high-level reservoir (1), an outlet nozzle (2) preferably in a horizontal position, at least one pipe bend (3) connected to the outlet nozzle (2), and a drop-pipe (4) and a control valve (5) in the vicinity of the end of the drop-pipe.

12 Claims, 1 Drawing Figure

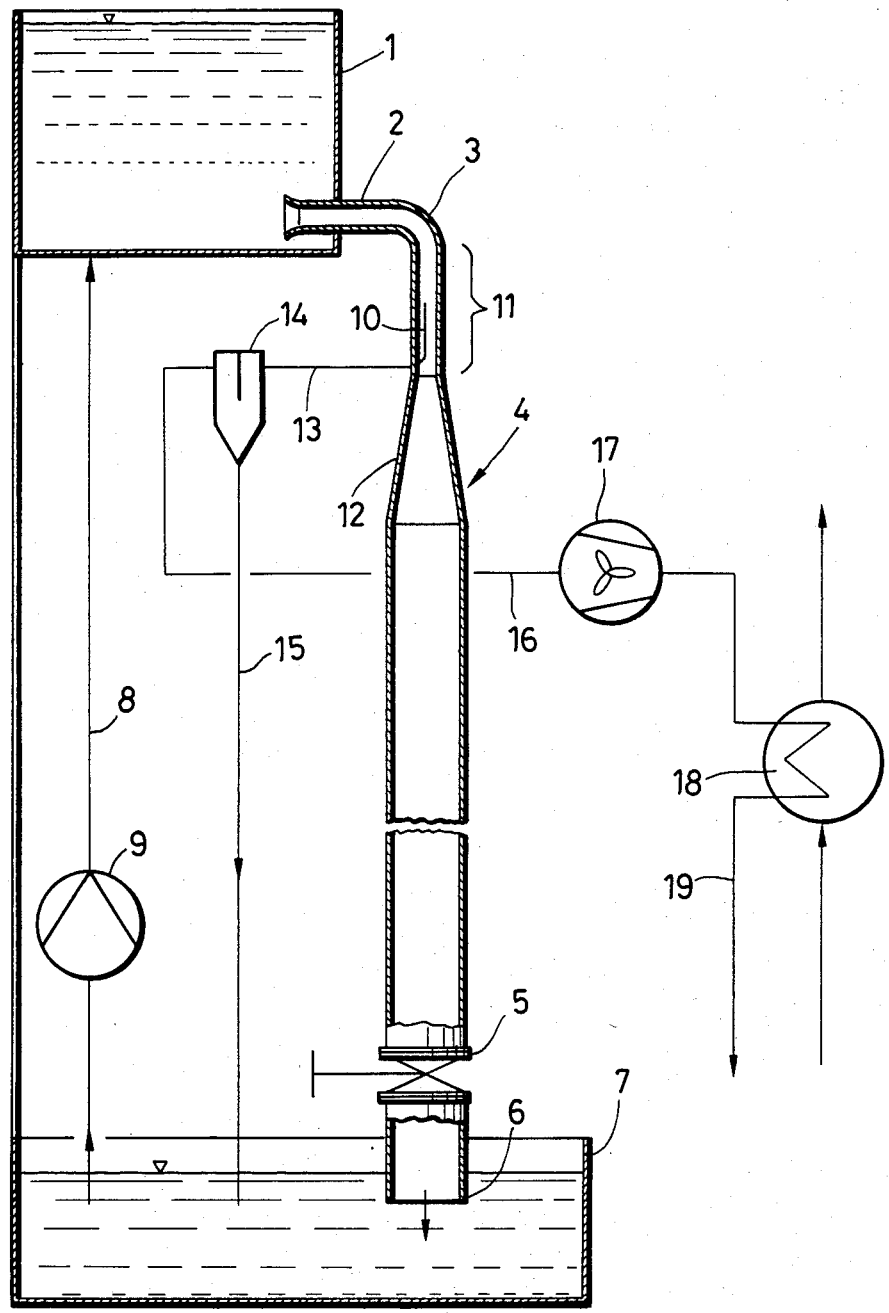

PROCESS AND EQUIPMENT, IN PARTICULAR FOR THE CONDITIONING OF WASTE WATER SLUDGES

BACKGROUND OF THE INVENTION

The invention relates to a process and equipment for the treatment of liquid/solids mixtures, in particular for the conditioning of suspended solids by means of cavitation.

The boiling point of liquids is strongly dependent on pressure. The boiling temperature drops with decreasing pressure. Under strong vacuum, such as may occur at high velocities, or when ambient pressure drops, pressure can decrease locally to boiling pressure. Such conditions frequently occur in hydrodynamic flow machines, such as pumps, turbines, propellers, for instance when turbine blades are passed, etc. This results in what is know as cavitation. In it, vapour and gas-bubbles are released from the liquid and cause the formation of voids. A subsequent pressure rise is accompanied by rapid collapse of the bubbles, so-called impact condensation (E. Truckenbrodt, "Steuerungsmechanik", Springer Verlag 1968, Page 15 or Dubbel "Taschenbuch für den Maschinenbau", Springer Verlag 1983, Page 893).

Although this phenomenon is in many cases undesirable owing to the possiblity of erosion of the material around which flow takes place, and also due to the considerable noise caused by cavitation, it may be usefully applied in other cases, in particular, for instance, as an aid in the destruction of germs in waste water. DE-PS 24 55 633 deals with this.

In this known process such an amount of sonic energy is introduced into the water in zones with a sufficient ozone concentration for the destruction of germs that cavitation occurs, permitting the attainment of an increase in the germicidal effects of the ozone in the waste water. These familiar means of generating cavitation by means of sonic energy involve a high degree of equipment complexity and investment. A method is also known of generating cavitation by means of a cavitator, which can essentially be compared to a centrifuge. This is also a relatively complex and expensive solution.

SUMMARY OF THE INVENTION

The object of the invention is to provide a solution with which a material mixture can be simply subjected to an at least area-type cavitation, with the resulting advantages.

In a process of the type defined before, this problem is solved in accordance with the invention in that the material mixture to be treated is withdrawn from a high-level reservoir, passed through at least one pipe bend, and then to a drop-pipe in such a way that a cavitation zone is formed in the flow at least in areas within and downstream of the pipe bend.

Due to cavitation formation in the flow, the pressure in this area drops. A portion of the liquid evaporates rapidly. This also applies to the cell-water contained in bacteria. The cell-walls are destroyed and the protein mass is opened up for further treatment. In subsequent impact condensation, the vapour in the bubbles which have been formed condenses suddenly. The bubbles collapse, with the occurrence of extremely high pressure surges. The pressure surges destroy the remaining cell-walls of all biological substances in the material mixture to be treated, in particular also the cell-walls of waste water bacteria to be destroyed, where this has not already occurred during the formation of vapour bubbles. The waste water sludge can more easily be dewatered.

Various embodiments of the invention are achieved in that the material mixture to be treated is submitted to a number of cavitation zones installed in series and/or in parallel.

It can also be arranged that the deflection and further routing of the material mixture takes place in such a way that the cavitation zone is formed across the entire flow cross-section. As well as a process for conditioning of waste water sludges, the invention also provides for heating of the sludge up to 60°–80° C., raising of the pH value to 8–12 and subsequent lowering to 2–6, all following conditioning by means of cavitation. This mode of operation permits simple flocculation of the protein masses contained in the sludge.

For the purpose of solution of the problem defined above, the invention also relates to equipment comprising a high-level reservoir, an outlet nozzle preferably in a horizontal position, at least one pipe bend connected to the outlet nozzle and a drop-pipe with a control valve in the vicinity of the end of the drop-pipe.

This equipment is comparatively simple, but very effective. Using it, it is in particular possible to control the formation of the cavitation by means of very simple design measures and to adapt it to respective requirements.

The invention can also provide for the diameter of the drop-pipe to become larger downstream of the cavitation zone. Expansion of diameter below this point permits the pressure to be increased purposefully in such a way that the cavitation occurs in the required form.

It may also be purposeful to install below the drop-pipe a collecting basin and pump mechanism for return of the liquid to the high-level reservoir. This would be particularly useful where the liquid to be treated is to be subjected several times to cavitation treatment.

The invention can also provide for the installation of a number of pipe bends with connecting drop-sections in series and/or in parallel. Such a succession of pipe bends and drop-sections permits the withdrawal of whole ranges of media or the submission of a volume of fluids to be treated to a very high degree to the respective cavitation areas.

BRIEF DESCRIPTION OF THE DRAWING

The invention is explained in more detail below using the drawing by way of example. The drawing shows in one FIGURE the equipment in accordance with the invention.

DETAILED DESCRIPTION OF THE INVENTION

In the example shown, a high-level reservoir 1 is equipped with a horizontal outlet nozzle 2, which empties via a pipe bend 3 into a drop-pipe designated as 4.

Drop-pipe 4 is installed in the direction of gravity flow and has a control valve 5 at its lower end. Drop-pipe 4 empties with its extraction opening 6 into a collecting basin 7. From collecting basin 7, a return line 8 leads via a pump 9 to the high-level reservoir 1.

Of subordinate significance for the present invention are the items of equipment 10 directly downstream of pipe bend 3 in a vertical pipe section, which is designated with a bracketed 11 and which is intended to represent the cavitation section. Drop-pipe 4 tapers out into a funnel shape downstream of equipment 10, for instance baffle plates with extraction nozzles. This area has been designated 12.

As already mentioned, equipment 10 is fitted with an exhauster line 13, which empties in the example shown into liquid separator 14. The liquid separated is passed via line 15 to collecting basin 7. The treated vapours are passed in the example shown via line 16 to a vapour compressor 17, thence to a heat exchanger or condenser 18. Condensate discharge is designated 19. This item of equipment, including equipment 10, can in this context be dispensed with.

The variants of the invention described naturally can be modified in many respects, without departing from the basic idea. The invention is thus, in particular not restricted to any specific cross-section shape, particularly with regard to the pipe bend and drop-pipe. For this purpose, a circular cross-section customary for pipes can be selected, just as can an oval, angular, or polygonal shape. Nor must the bend in the pipe bend necessarily be the same as shown in the illustration. The 90° deflection can be replaced by any deflection ranging from 45° to 135° C. This depends on the process in which the equipment is to be installed, or on the media to be treated.

We claim:

1. Process comprising: treating liquid-solid mixtures for effecting cavitation within the mixture to create impact condensation sufficient to destroy the cell-walls of all biological substances within the mixture by the steps of containing the material mixture in a high-level reservoir, withdrawing the material mixture from the reservoir and passing the mixture through at least one pipe bend having a generally horizontally extending first section extending from the reservoir and a generally vertically extending second section extending downwardly from the first section, providing a generally vertically oriented downwardly extending down pipe from the second section, and effecting a pressure reduction in the material flowing downwardly through the pipe bend into the down pipe for effecting impact condensation.

2. Process according to claim 1, including the step of passing the material mixture to be treated to a number of serially arranged cavitation zones.

3. Process according to claim 1, including the step of passing the material mixture to be treated through a number of parallel cavitation zones.

4. Process according to claim 1, including the step of passing the material mixture to be treated through a number of cavitation zones arranged in series and in parallel.

5. Process according to claim 1, 2, 3 or 4, including directing the material mixture through baffles so that the cavitation zone is formed across the entire cross-section of flow.

6. Process, as set forth in claim 1, 2, 3 or 4, including the steps of, following cavitation, heating the mixture to the range of 60° to 80° C., raising the pH value to the range of 8–12, and subsequently lowering the pH value to the range of 2–6.

7. Equipment comprising: means for the treatment of liquid-solid mixture for effecting cavitation within the mixture to create impact condensation sufficient to destroy the cell-walls of all biological substances within the mixture wherein the improvement includes a high-level reservoir containing the material mixture to be treated, a generally horizontally arranged outlet nozzle from said reservoir, at least one pipe bend having a generally horizontally arranged first section connected to said outlet nozzle and a generally vertically arranged second section depending from said first section, a generally vertically arranged drop pipe connected to and extending downwardly from said second section of said pipe bend, a control valve located in said drop pipe adjacent the lower end thereof, and means at the juncture of said second section and said drop pipe for effecting a pressure drop in the material mixture flowing from the reservoir for creating impact condensation.

8. Equipment, as set forth in claim 7, wherein the end of said drop pipe connected to said second section increases in diameter in the downward direction of said drop pipe.

9. Equipment, as set forth in claim 8, wherein a collecting basin located at the lower end of said drop pipe for receiving the flow of the mixture therefrom, means connected to said collecting basis and including pumping means for returning fluid from the collecting basin to the high-level reservoir.

10. Equipment, as set forth in claim 7, 8 or 9, wherein a number of said pipe bends and said drop pipes are arranged in series.

11. Equipment, as set forth in claim 7, 8 or 9, wherein a number of pipe bends and drop pipes are connected to said reservoir in parallel.

12. Equipment, as set forth in claims 7, 8 or 9, wherein a number of pipe bends and drop pipes are arranged in series and parallel for receiving flow from said reservoir.

* * * * *